Figure 1:
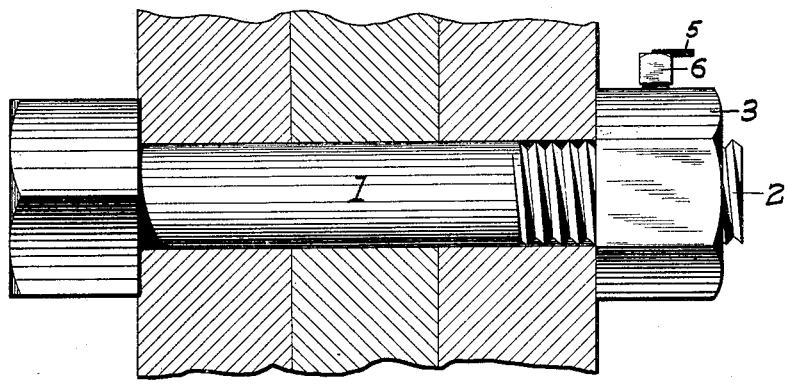

No. 791,051. PATENTED MAY 30, 1905.
A. P. STEEL.
NUT LOCK.
APPLICATION FILED MAR. 6, 1905.

Witnesses
Frank H. Carter.
Percy S. Webster

Inventor
Abraham P. Steel.
By Joshua B. Webster
Attorney

No. 791,051.              Patented May 30, 1905.

UNITED STATES PATENT OFFICE.

ABRAHAM P. STEEL, OF STOCKTON, CALIFORNIA.

NUT-LOCK.

SPECIFICATION forming part of Letters Patent No. 791,051, dated May 30, 1905.

Application filed March 6, 1905. Serial No. 248,485.

*To all whom it may concern:*

Be it known that I, ABRAHAM P. STEEL, a citizen of the United States, and a resident of Stockton, in the county of San Joaquin and State of California, have invented certain new and useful Improvements in Nut-Locks; and I do declare the following to be a full, clear, and exact description of the invention, such as will enable others skilled in the art to which it appertains to make and use the same, reference being had to the accompanying drawings, and the characters of reference marked thereon, which form a part of this specification.

This invention relates to improvements in nut-locks; and my object is to produce such a nut as may be easily and effectually locked upon the bolt and prevented from being jarred loose, but which may be loosed by hand readily, if so desired; also, to produce such a nut-lock as may be cheaply made. These objects I accomplish by the peculiar construction and adaptation of parts herein fully described, and particularly pointed out in the claim appended.

In the drawings similar characters of reference indicate corresponding parts in all the views.

Figure 2:
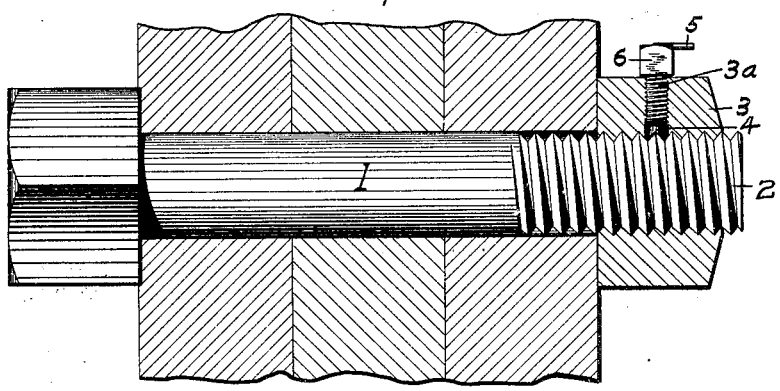
Figure 3:
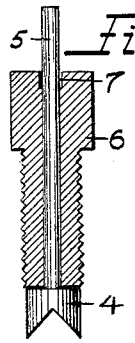
Figure 4:
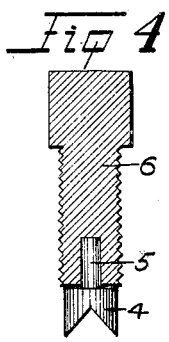
Figure 5:
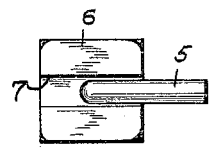

Figure 1 is a side elevation showing the nut locked. Fig. 2 is a sectional view of same. Fig. 3 is a vertical section of a set-screw device. Fig. 4 is a modification of same. Fig. 5 is a top plan view of a set-screw.

1 designates the bolt proper, and 2 the threaded portion thereof, on which is mounted a nut 3, which nut is provided with a threaded orifice 3ª extending through one side thereof.

4 is an inverted-V-shaped tooth adapted to fit through the orifice 3ª and fit over one of the threads of the bolt, and 5 is a shank extending upwardly from said tooth through said orifice.

6 is a hollow set-screw adapted to fit over the shank 5 and threaded to screw into the orifice 3ª. Said set-screw is screwed down until it forces the tooth 4 to bite into the threads on the bolt, and then the top of the shank 5 is bent over into a transverse groove 7 in the top of said set-screw. Thus it will be seen that the nut is firmly locked onto the bolt by means of the tooth and set-screw and that the set-screw is prevented from unscrewing by means of the shank 5, bent into the groove 7, and thus I have a perfect nut-lock which cannot be released until the said shank is bent out of engagement with the said groove 7. Fig. 4 shows a modification where the said tooth is simply pivotally secured in the lower end of the set-screw and does not extend all the way through. This is used in places where the jar is so slight that there is no danger of the set-screw loosening.

I have now entered into a detailed description of the construction and relative arrangement of parts embraced in the present and preferred embodiment of my invention. I do not desire, however, to be understood as confining myself to such specific construction, as such changes and modifications may be made in practice as fairly fall within the scope of my claim.

Having thus described my invention, what I claim as new and useful, and desire to secure by Letters Patent, is—

In a device of the kind described the combination of a bolt, a nut mounted thereon, a threaded orifice extending through one side of said nut, a hollow set-screw inserted in said orifice, an inverted-V-shaped tooth inserted in said orifice below said set-screw, said tooth having a shank extending upward through said set-screw, and a transverse groove in the top of said set-screw into which the said shank may be bent, as specified.

In testimony whereof I have signed my name to this specification in the presence of two subscribing witnesses.

ABRAHAM P. STEEL.

Witnesses:
 PERCY S. WEBSTER,
 JOSHUA B. WEBSTER.